United States Patent [19]

Bazin et al.

[11] Patent Number: 5,389,399
[45] Date of Patent: Feb. 14, 1995

[54] APPARATUS FOR THE TREATMENT OF SEED

[75] Inventors: Michelle Bazin, Outarville; Michel Taron, Le Raincy, both of France

[73] Assignee: Etablissements Ceres S.A., Mereville, France

[21] Appl. No.: 100,155

[22] Filed: Aug. 2, 1993

Related U.S. Application Data

[63] Continuation of Ser. No. 852,712, Mar. 17, 1992, which is a continuation of Ser. No. 754,236, Aug. 26, 1991, abandoned, which is a continuation of Ser. No. 532,352, Jun. 4, 1990, abandoned, which is a continuation of Ser. No. 409,735, Sep. 20, 1989, abandoned, which is a continuation of Ser. No. 219,262, Jul. 15, 1988, abandoned.

[30] Foreign Application Priority Data

Jul. 16, 1987 [FR] France ................................ 87 10336

[51] Int. Cl.⁶ ............................................. B05D 7/00
[52] U.S. Cl. ...................................... 427/212; 427/215; 427/242; 427/4; 427/425; 118/19; 118/303; 118/319; 118/320; 118/417; 118/418
[58] Field of Search ................... 427/212, 215, 242, 4, 427/425; 118/19, 303, 417, 418, 319, 320; 366/57, 228, 229, 230, 231, 225, 606

[56] References Cited

U.S. PATENT DOCUMENTS

| 250,578 | 12/1881 | Richmond . | |
|---|---|---|---|
| 1,093,723 | 4/1914 | Owens | 366/57 |
| 1,427,435 | 8/1922 | Winkler | 366/228 |
| 1,522,431 | 1/1925 | Finley | 366/57 |
| 2,135,436 | 11/1938 | Ball . | |
| 2,136,045 | 11/1938 | Faber . | |
| 2,254,639 | 9/1941 | Andrae . | |
| 3,751,218 | 8/1973 | Cherenson | 432/134 |
| 4,245,580 | 1/1981 | Okawara | 118/19 |
| 4,465,017 | 8/1984 | Simmons | 118/418 |
| 4,465,017 | 8/1984 | Simmons | 118/418 |
| 4,499,847 | 2/1985 | Dunaitschik | 366/105 |
| 4,543,180 | 9/1985 | Riker | 209/44 |
| 4,543,907 | 10/1985 | Fowler | 118/19 |
| 4,586,457 | 5/1986 | Dunajtschik | 118/19 |
| 4,644,665 | 2/1987 | Naunapper et al. | 34/26 |
| 4,658,754 | 4/1987 | Messner et al. | 118/303 |

FOREIGN PATENT DOCUMENTS 7790 of 1913 United Kingdom .
1562224 3/1980 United Kingdom .

Primary Examiner—Shrive Beck
Assistant Examiner—David M. Maiorana
Attorney, Agent, or Firm—Burns, Doane, Swecker & Mathis

[57] ABSTRACT

Seed is treated with a treatment agent within a rotary drum having rows of circumferentially spaced stirring plates mounted therein. When the drum is rotated about a substantially horizontal axis the plates raise seed from the bottom of the drum. At their uppermost positions the plates are inclined so that seed falls from the plates into a vertical passage defined between adjacent rows of plates. Treatment agent is introduced inside the drum such that the agent is applied to the seed traveling downwardly along the vertical passage.

7 Claims, 2 Drawing Sheets

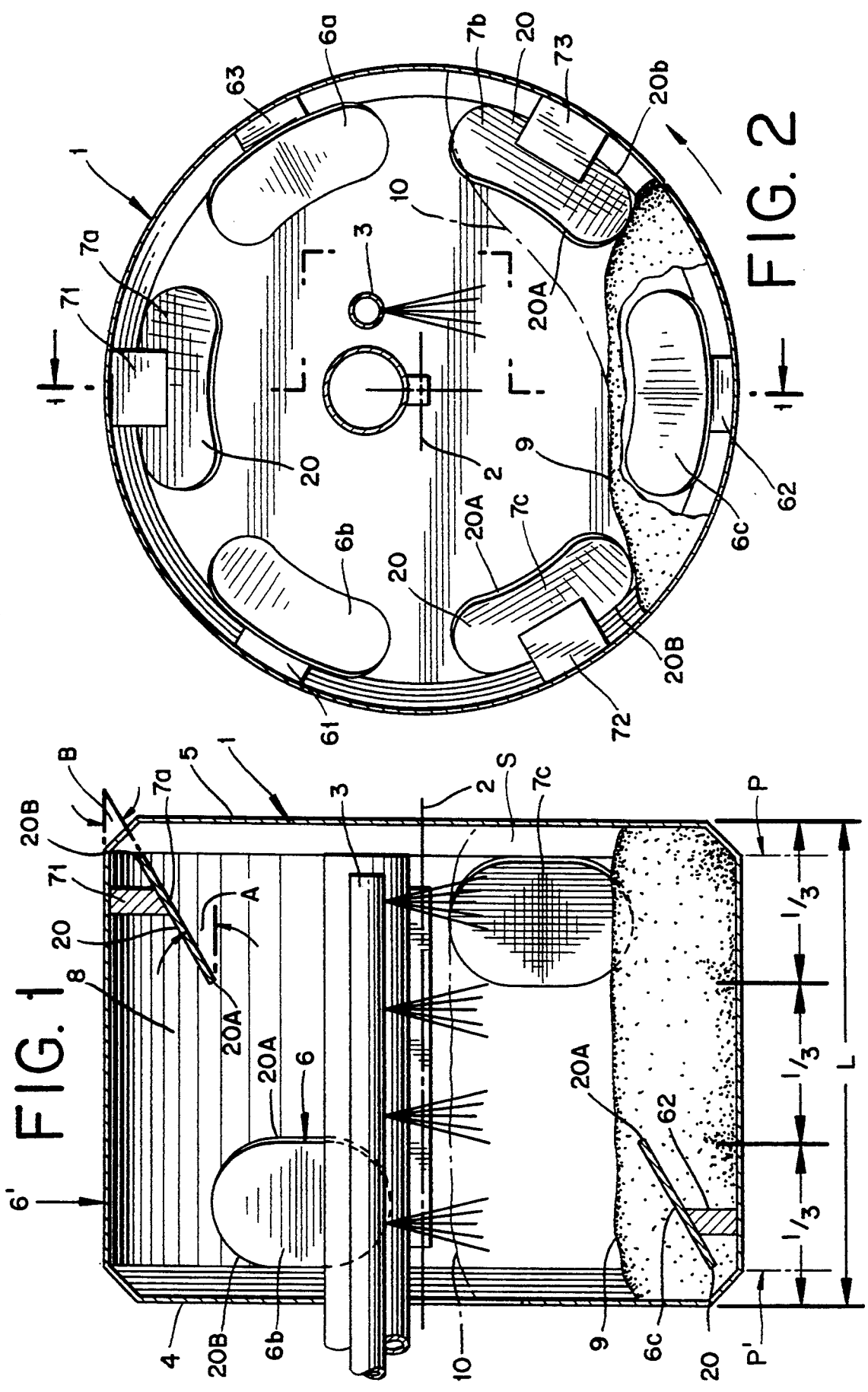

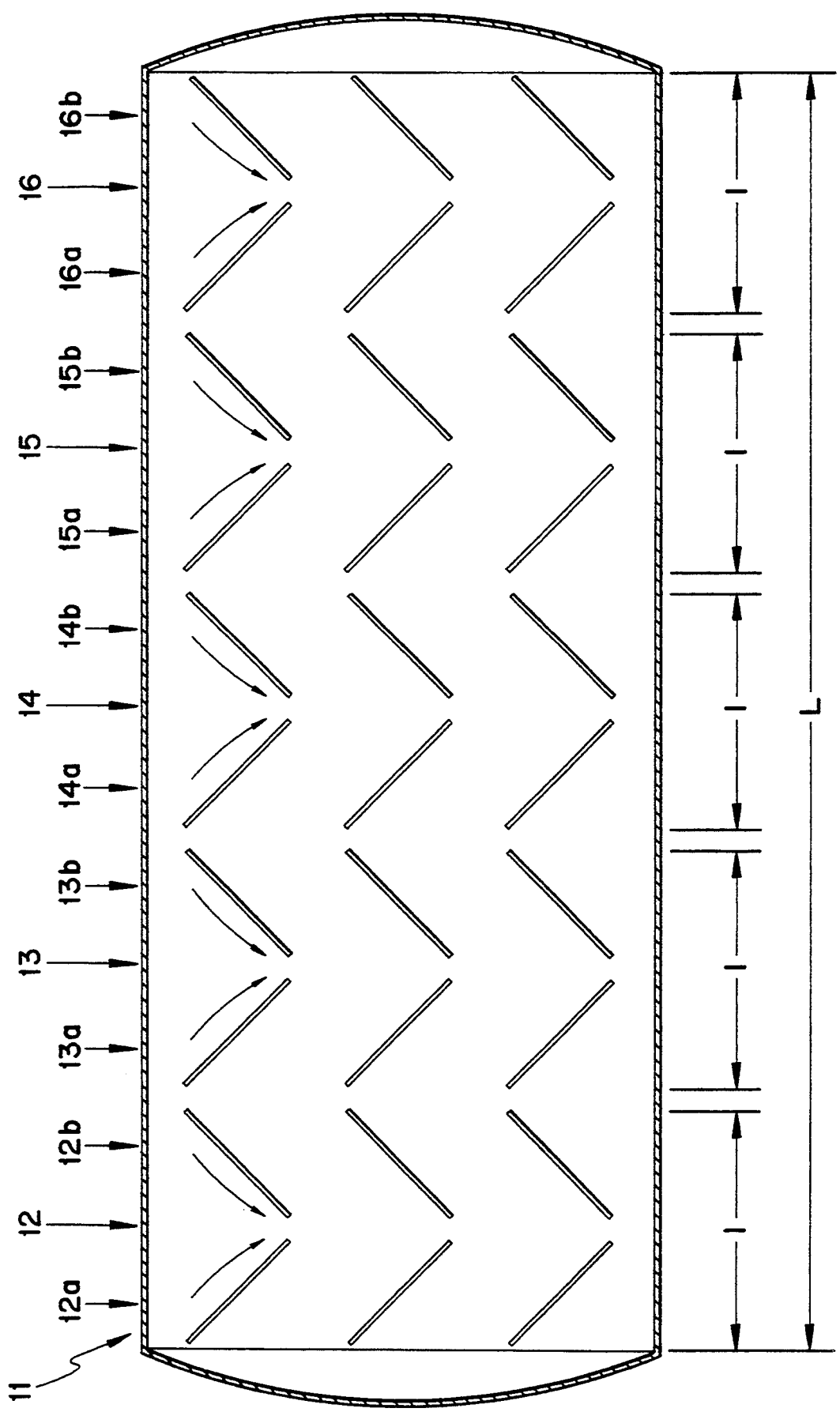

APPARATUS FOR THE TREATMENT OF SEED

This application is a continuation of application Ser. No. 07/852,712, filed Mar. 17, 1992, which is a continuation of Ser. No. 07/754,236, filed Aug. 26, 1991, abandoned, which is a continuation of Ser. No. 07/532,352, filed Jun. 4, 1990, abandoned, which is a continuation of Ser. No. 07/409,735, filed Sep. 20, 1989, abandoned, which, in turn, is a continuation of Ser. No. 07/219,262, filed on Jul. 15, 1988, now abandoned.

BACKGROUND OF THE INVENTION

The present invention relates to the treatment of seed.

"Seed" means any plant member capable of resulting in the reproduction of a plant and obtained either by a sexual route, in which case it will be referred to as grain, or by vegetative reproduction, in which case it will be referred to as a plant or explant.

A treatment means any application of a liquid or solid product to the surface of the seed.

When this application results in a change in the shape of the seed, for example to permit mechanical sowing of individual seeds, then coating techniques are involved. These generally comprise, in a first stage, the deposition of an adhesive product onto the seed and then, optionally after partial drying, the deposition of a liquid charge or of a powder, a treatment agent, an agro-chemical product, a dye or other adjuvant which fertilizes or improves the germination conditions of the seed.

When this application is carried out without changing the shape of the seed, for example to provide protection, and, optionally, a colour or an appearance, then this will be referred to as film-coating. This technique comprises spraying the seed to form a deposit of a liquid, frequently aqueous, composition of a film-forming product containing a treatment agent, and simultaneously drying the deposit obtained.

These coating and film-coating techniques rely, among others, on rotary horizontal cylindrical drums comprising, besides the drum as such, means for driving it, means for distributing the charge and the treatment agent and, optionally, means for drying. To ensure homogenization of the treatment, it is known to provide stirring members inside the drum. However, despite a marked improvement in the quality of the coating, this is frequently insufficient on an industrial scale when, for example, seed of irregular shape is treated or when it is intended to produce a film coating requiring a deposit of high quality, that is to say of high uniformity, over the entire surface of the seed, for protection and/or for colouring.

There is therefore a need to make it possible to carry out these treatments for protection and for improved appearance of these seeds, in order to improve the efficiency during the sowing.

SUMMARY OF THE INVENTION

According to the present invention there is provided a rotary drum, having a substantially cylinderical peripheral wall mounted with its axis substantially horizontal, and two end walls, the drum being mounted for rotation about said axis and defining a volume in the bottom part of which there is located the bed of seeds to be treated, comprising means for distributing the charge or the treatment agent, means for driving the drum in rotation and directing members, fastened to the inside of the drum, for stirring the bed of seed during the treatment, in which these directing members consist of at least one pair of vertical rows of blades of opposite inclination such that:

a) each row is situated in one of the transverse zones of the volume of the drum substantially parallel to the latter's end walls, the two rows thus creating between them a substantially vertical passage for the seeds to flow through;

b) the blades are inclined relative to the axis of the rotation of the drum;

c) two neighbouring blades of each row subtend an angle diverging towards the peripheral wall of the drums;

d) the blades of one of the rows are offset angularly relative to the blades of the other row, as viewed along the axis of the drum and the part of each blade which is used for the stirring is the radially inward part, spaced from the peripheral wall.

Such an apparatus permits each seed to be introduced a substantially identical number of times to the means for distributing the treatment agent, this being done throughout the treatment period.

The central passage for the seed to flow through is an essential feature of the apparatus according to the invention, this passage being substantially vertical. It must be sufficiently wide not to produce a shovel effect on the seed, that is to say not to entrain the seed towards the upper part of the drum and to make it shower down again in an uncontrolled fashion, without being excessively large, in which case the stirring of the seed is inadequate to ensure the homogeneity of the coating of the said seed.

The term "blade" means a rigid shape having a surface permitting a small volume of seeds to be pushed from one point to another within the volume of the drum, that is to say to have an efficient shovel effect. This surface may be planar or, alternatively, to improve the recirculation of the seed from below onto the top and vice versa, slightly twisted to avoid making the seed rise back into the drum.

In what follows, the inclination of the blades refers to the inclination of the latter's mean plane, that is to say the plane tangent to the surface at the centre of symmetry of this surface.

The inclination of the blades, as defined above, relative to the axis of rotation of the turbine, determines the rate of flow of the seed in the central flow passage.

It has been noted that very uniform results are obtained when the width (i.e. the axial length) of the central passage is approximately one third of the axial length of the drum. Similarly, an inclination of 30° to 60°, preferably of 40° to 50°, is advantageous.

Furthermore, the blades in the apparatus according to the invention are such that two neighbouring blades, one belonging to one row and the other belonging to the other row of opposite direction, which are therefore of different inclination, form between them an angle diverging towards the periphery of the drum, so that the seed starting from the top of the bed of seed is guided back towards the central flow passage. This angle is generally between 30° and 60° and preferably between 40° and 50°.

Furthermore, the blades of one row are not opposite those of the other row, but are offset angularly, as viewed along the axis of the turbine. This is important, in order to ensure both an undisturbed downward flow of the seed (no seed blockage between the bottom part of the blades) at the same time as stirring of the seed coming from an upper blade with that situated on an opposed lower blade.

Lastly, and in contrast with numerous known devices, the part of the blades which is used for the stirring must end at a certain distance from the neighbouring end walls of the drum. This distance is generally small but must be sufficient to permit the lateral seed to slide downwards and to fall back into the cycle of the general movement towards the centre.

Thus, bearing in mind this condition and the dimensions of the central flow passage, the orthogonal projection of the blades on the drum axis is always smaller than one half of the axial length of the drum and is preferably approximately close to one third of this length.

All the above parameters may be modified as a function of the nature, the shape and the quantity of the seed to be treated, of the type of method applied, and of the required effect on the seed. In all cases, stirring of such quality is obtained that, on average, the seed passes the same number of times under the spray of the treatment product.

The blades described above may be solid or hollow or perforated and may be made of any material provided that it is sufficiently resistant to abrasion, non-adhesive to the charges applied onto the seed and inert towards the treatment products.

Similarly, the drum may be solid or perforated, especially if an external suction or blowing device is provided particularly for drying the seed.

The above description applies to a pair of rows of blades, but it is quite obvious that, in order to increase the capacity and/or the throughput of the unit, the device according to the invention may comprise a number of pairs of rows of blades in series, that is to say coaxial with the first row, and capable of being identical with or different from the first in size and inclination.

BRIEF DESCRIPTION OF THE DRAWINGS

In order that the invention may more readily be understood, the following description is given, by way of example only, reference being made to the accompanying drawings, in which:

FIG. 1: an axial cross-section of one embodiment of apparatus according to the invention.

FIG. 2: a view in cross-section along a diametral plane, of the apparatus of FIG. 1.

FIG. 3: a sectional view of another embodiment of apparatus according to the invention comprising five coaxial pairs of rows of blades.

DETAILED DESCRIPTION OF PREFERRED EMBODIMENTS OF THE INVENTION

FIGS. 1 and 2 show a horizontal cylindrical drum 1 having transverse end walls 4 and 5 and a cylindrical peripheral wall 6. The drum is capable of being rotated about its axis 2 by driving means which are not shown, and is provided in its interior with means 3 for distributing a treatment product, for example nozzles for spraying an aqueous dispersion of a film-forming product, or powder distributors. Inside the drum 1, in each of the parts of the volume which are close to the end walls 4, 5 respectively, there are two rows 6 and 7 of blades *6a*, *6b*, *6c*, and *7a*, *7b*, *7c* secured by means of the fastenings 61, 62, 63 and 71, 72, 73 respectively, onto the cylindrical wall 8. These blades are inclined at 45° C. relative to the axis of the drum, and are arranged symmertrically relative to the diametral plane of the drum (cf. FIG. 2), that is to say the blades are offset by 120° C. relative to one another in this plane. Lastly, row 7 is offset by 60° C. relative to the row 6. These two rows of blades create a central flow passage 8, the width of which (i.e. the axial length of which) advantageously represents one third of the axial lenght 1 of the drum. The bed of seed is indicated by 9 when the drum is at rest and by 10 when it is in operation. It can be clearly seen that, as a results of the arrangement of the blades, the seed is stirred in a paticularly homogeneous manner.

Each blade includes a proximal edge 20A located closet to the central flow passage 8, and a remote edge 20B located farthest from the flow passage 8. The remote edge 20B is spaced from the peripheral wall 6 and the adjacent end wall 4 (or 5) to form therebetween a space S along which seeds can slide as expalined earlier herein. It will be appreciated that the width dimension of the passage 8 (i.e., its dimension parallel to the axis 2) is slightly greater than one-third of the longitudinal spacing between two planes P, P′ in which the remote edges 20B of the two rows of blades lie, as is evident from FIG. 1.

FIG. 3 shows diagrammatically a drum 11 according to the invention, comprising five pairs of rows, 12, 13, 14, 15, 16 of blades *12a*, *12b*, *13a*, *13b*, *14a*, *14b*, *15a*, *15b*, *16a*, *16b* of the type described in FIGS. 1 and 2. In this construction, however, the axial lenght of the free space forming a central flow passage for 14 seeds is relatively less, being approxiamtely one third of the axial lenght of each of the blades.

We claim:

1. A method for the treatment of seed with a treatment agent, comprising the steps of:

A) providing a rotary drum defining a longitudinal axis, two longitudinally spaced end walls interconnected by a generally cylindrical peripheral wall, a bottom portion of said drum forming a seed-carrying space, at least first and second rows of circumferentially spaced stirring plates mounted to an inwardly facing surface of said drum, said first and second rows of plates being longitudinally spaced apart to define a vertical flow passage therebetween, said plates of said first row being angularly offset about said axis relative to said plates of said second row whereby the plates of each row reach their uppermost positions in the drum at different times than the plates of the other row, each plate being inclined at an angle of inclination relative to said axis such that when each plate is located at its uppermost position in said drum, a remote edge of said plate located farthest from said vertical flow passage is higher than a proximal edge of said plate located closest to said vertical flow passage;

B) introducing seed into said drum to form a seed bed in said seed-carrying space;

C) repeatedly rotating said drum about a substantially horizontal axis intersecting said two end walls so that stirring plates raise seed from said seed-carrying space, some of the raised seed falling from said remote edges of said stirring plates, and the rest of the raised seed falling from said proximate edges and into said vertical flow passage for downward travel back to said seed-carrying space; and D) introducing seed treatment agent into said drum during step C so that said treatment agent is applied onto seed as the seed travels downwardly along said vertical flow passage.

2. A method according to claim 1 including arranging said stirring plates so that they are oriented at an angle of inclination of from 30 to 60 degrees when reaching said uppermost position.

3. A method according to claim 1 including arranging said stirring plates so that they are oriented at an angle of inclination of from 40 to 50 degrees when reaching said uppermost position.

4. A method according to claim 1 including arranging said stirring plates so that they are oriented at an angle of inclination of 45 degrees when reaching said uppermost position.

5. A method according to claim 1, wherein step D comprises introducing seed treatment agent in the form of a seed treatment fertilizing agent.

6. A method according to claim 1, wherein said step D comprises introducing a seed treatment agent in the form of a liquid seed treatment agent which is sprayed into said drum.

7. A method according to claim 1, wherein step D comprises introducing a seed treatment agent in the form of a powderous seed treatment agent.

* * * * *